S. W. ANDERSON & G. C. KAAR.
PROCESS OF PRODUCTION OF LEAD SOLUTIONS FROM LEAD ORE.
APPLICATION FILED DEC. 27, 1912.
1,083,910.
Patented Jan. 13, 1914.
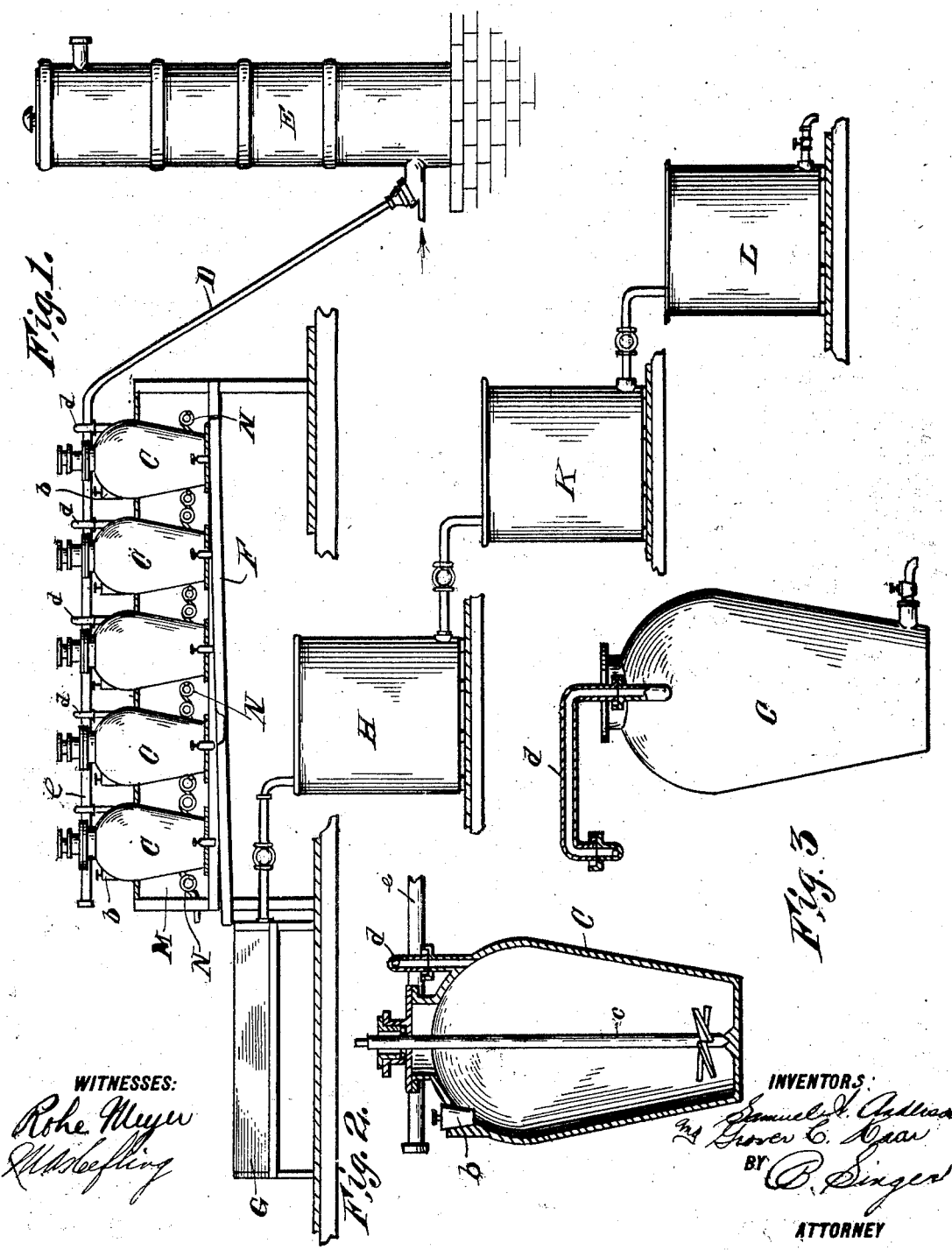

UNITED STATES PATENT OFFICE.

SAMUEL W. ANDERSON AND GROVER C. KAAR, OF SPOKANE, WASHINGTON.

PROCESS OF PRODUCTION OF LEAD SOLUTIONS FROM LEAD ORE.

1,083,910. Specification of Letters Patent. Patented Jan. 13, 1914.

Application filed December 27, 1912. Serial No. 738,939.

*To all whom it may concern:*

Be it known that we, SAMUEL W. ANDERSON and GROVER C. KAAR, citizens of the United States, residing at Spokane, in the county of Spokane, State of Washington, have invented certain new and useful Improvements in Processes of Production of Lead Solutions from Lead Ore, of which the following is a specification.

This invention relates to a novel process and apparatus for the manufacture of lead solutions directly from lead ore (galena) by a wet process and without the usual smelting of the ore to metallic lead; and it comprises a process first of obtaining the lead in the form of a lead nitrate solution, and then of purifying this solution from accompanying impurities; and it also comprises a novel apparatus for effecting such solution; all as more fully hereinafter set forth and as claimed.

The objects of the invention are the production of pure solutions of lead and particularly of pure lead nitrate solutions directly from lead sulfid ore in an efficient and economical manner.

Briefly the process of dissolving the ore comprises pulverizing the ore, treating the pulverized ore with a 7% solution of nitric acid at a temperature of 150 to 165° F., recovering the oxids of nitrogen in the form of dilute nitric acid, mixing this dilute nitric acid with concentrated acid to give the standard solution for dissolving the lead and purifying the impure lead nitrate solution from impurities, and particularly from iron, by precipitating the iron in two successive stages, as more fully hereinafter described.

The accompanying drawings illustrate the apparatus in which this process can be carried out.

Figure 1 is an elevational view of our improved apparatus. Fig. 2 is a detail view showing in section one of the reaction vessels and illustrating the stirrer used therein. Fig. 3 is a side elevation of one of the vessels such as is shown in Fig. 2 with certain of the connection pipes shown in sections.

Concentrated nitric acid is produced from sulfuric acid and sodium nitrate (in a still not shown). This concentrated acid is diluted with the dilute acid from the tower E to form the standard 7% solution. The solution of lead sulfid is effected in the stoneware vessels C which are of a non-porous character and which are provided with an agitator $c$ and with stoppered openings $b$ for charging the acid and ore. The ore pulverized to suitable mesh (40 to 50) is charged together with sufficient of the 7% acid into the vessels C, enough acid being used to dissolve all or most all of the lead sulfid. The jars C are provided with outlets $d$ connected with the pipe $e$ leading through the pipe D to the bottom of the regenerating tower E. The vessels C are set in a tank M filled with water and provided with steam coils N for heating the water and the vessels to a temperature of 150 to 165° F. At this temperature solution of the ore is effected with accompanying agitation and a solution of lead nitrate obtained. In practice it is found that all of the acid does not combine with the lead and that the resulting solution of lead nitrate contains more or less acid. The neutralization of this acid will be referred to below. It is found also that the hydrogen sulfid formed by the action of the nitric acid and lead sulfid at this elevated temperature decomposes part of the nitric acid into oxids of nitrogen, and that about 25% of all the acid charged is thus converted. Means is provided according to the present invention for recovering these gases as dilute nitric acid and for using them again in the process. After the reaction has been completed at the constant temperatures indicated there has been formed nitrate of lead, nitrate of iron from the iron ore accompanying the lead, sulfur and the oxids of nitrogen. The oxids of nitrogen, however, escape as gases and are recovered in the tower E. There remains in the vessels C any undecomposed galena at the bottom of the vessels, and also a layer of the silicious portion of the ore above the galena; and the solution of lead nitrate thereabove, with some of the sulfur at the bottom and most of it at the top of this solution in the form of a scum. The stoneware faucets at the bottom of the jars are now opened and the solution of the nitrates withdrawn into the trough F leading to the settling tank G. The galena is so heavy that most of it does not flow out but remains in the jars C; while the silicious material, sulfur and nitrate solution flow to the settling tank. The excess of ore remains in the jar and will be acted upon in the subsequent reaction. It will thus be seen that by means of the steam coils the temperature of the reaction can be accurately and positively controlled.

The oxids of nitrogen escaping through the pipe D are mixed at the bottom of the tower E with air and steam and flow out through this tower meeting a current of water or dilute acid flowing down over baffles or balls or other distributing means. Here the oxids of nitrogen are oxidized and dissolved as dilute nitric acid, the dilute acid being returned to the top of the tower (by means not shown) and being used over again until its strength has been increased to the desired extent. It is then mixed with the concentrated acid to form the standard 7% solution. It will thus be seen that the acid which would otherwise be lost is returned to the reaction and used again with resulting economy and with resulting decrease in the necessary amount of concentrated acid. Moreover, the concentrated acid is thus diluted without the use of water itself.

The specific structure of the inside of the tower E may vary, and the tower may be filled with balls, plates or other baffles. It has been found that the tower described in British Patent 14,774 of 1896 gives excellent results. In this tower the intimate mixture of the oxids of nitrogen with the air and steam and oxidation thereof is effected, and absorption of the nitric acid formed also takes place with the water or dilute nitric acid flowing down through the tower.

The reactions taking place in the dissolving of lead sulfid by nitric acid are as follows, it being understood that more or less iron, usually as iron sulfid, is present with the lead ore and is dissolved at the same time.

*Lead.*

$$PbS + 2HNO_3 = Pb(NO_3)_2 + H_2S$$
$$3H_2S + 2HNO_3 = 2NO + 3S + 4H_2O$$

*Iron.*

$$FeS_2 + 2HNO_3 = Fe(NO_3)_2 + H_2S + 2S$$
$$3H_2S + 2HNO_3 = 2NO + 3S + 4H_2O$$

Lead is thus changed from lead sulfid to lead nitrate, hydrogen sulfid being formed which reacts with a further amount of nitric acid to form sulfur and oxids of nitrogen. Similarly the iron sulfid (pyrites) is dissolved as ferrous nitrate, hydrogen sulfid and sulfur being set free and reacting the same as already described. Silicious matter is not affected. Any silver originally present as chlorid or sulfid remains unaffected in the residue. If, however, it is present in such form as to go into solution as silver nitrate, it is precipitated as chlorid of silver by a small amount of a solution of common salt, at this temperature and dilution the lead not being precipitated as chlorid.

The lead nitrate solutions are separated from the sulfur and sediment in the settling tank G and are then run into the tank H where any silver is precipitated as silver chlorid by a solution of sodium chlorid. The solution then flows into the tank K where the subsequent purification is effected. This solution now contains, besides the lead nitrate, principally the iron dissolved as ferrous nitrate, a part of which however may be present, due to oxidation, as ferric nitrate. Small amounts of arsenic and bismuth may also be present as impurities. It is desired to obtain the lead in the form of a pure solution free from these impurities. To effect this result there is added to the solution in the tank K at a boiling temperature obtained preferably by the direct injection of steam and air (by means not shown), an alkali which owing to its cheapness is advantageously sodium carbonate or soda ash, either as a solid or as a concentrated solution. Sufficient soda is added to neutralize any acid present and enough in excess to precipitate the iron according to the following reactions.

*For ferric iron.*

I. $2Fe(NO_3)_3 + 3Na_2CO_3 = Fe_2(CO_3)_3 + 6NaNO_3$

II. $Fe_2(CO_3)_3 + 3H_2O = 2Fe(OH)_3 + 3CO_2$ or I and II—

$2Fe(NO_3)_3 + 3Na_2CO_3 + 3H_2O = 2Fe(OH)_3 + 6NaNO_3 + CO_2$

*For ferrous iron.*

III. $Fe(NO_3)_2 + Na_2CO_3 = FeCO_3 + 2NaNO_3$

IV. $FeCO_3 + 3H_2O + O = 2Fe(OH)_3 + 2CO_2$

*For lead.*

V. $Pb(NO_3)_2 + Na_2CO_3 = PbCO_3 + 2NaNO_3$ $2Fe(NO_3)_3 + 3PbCO_3 = 2Fe(OH)_3 + 3Pb(NO_3)_2 + 3CO_2$

From these reactions it will be seen that the iron is first precipitated as carbonate but is at once decomposed into hydroxid and carbonic acid. The ferrous nitrate will be thrown down as ferrous carbonate, but will be oxidized in the hot solution by the steam and air and will be converted to ferric hydroxid. The iron is thus converted into an insoluble precipitate. The action, however, is not selective with respect to the iron and to the exclusion of the lead. More or less of the lead will also be precipitated as carbonate but owing to the relative solubilities of the lead carbonate and the iron carbonate the lead will be again dissolved and iron carbonate, or rather hydroxid, formed so long as there remains iron nitrate in the solution. Accordingly, and in order to prevent loss of lead, only sufficient soda is added at first to precipitate most but not all of the iron. When the reaction is complete an equilibrium will be established and the lead will still remain in solution with a small amount of the iron. There is then added a small amount only of the alkali to throw down the remaining small amount of iron. By proceeding in this manner the last traces of iron can be removed without loss of any appreciable amount of lead. In practising this precipitation and purification operation the iron content is determined from previous analysis and the quantity of soda added is such as is known to be less than the amount required to precipitate all of the iron as ferric hydroxid. After adding the soda the solution is heated in an open tank by the injection of steam and the iron thus precipitated as the ferric hydroxid, either directly or first as the ferrous compound followed by oxidation. Any lead precipitated as carbonate reacts with the ferric iron in solution to precipitate the latter, the lead going again into solution as already described. Thus all the iron corresponding to the amount of alkali added is precipitated without accompanying precipitation of lead at the end of the reaction. The precipitation is now repeated adding only a slight amount of soda. Any slight amount of lead precipitated during this last step can be left in the tank to be dissolved by the next charge of acid lead nitrate solution.

Instead of using sodium carbonate, sodium hydroxid or mixtures of sodium hydroxid and carbonate, or of other alkalis such as potassium hydroxid or carbonate can be used. When sodium hydroxid is used the precipitation takes place according to the following equation.

*For ferric iron.*

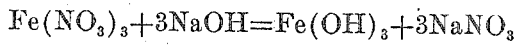
$$Fe(NO_3)_3 + 3NaOH = Fe(OH)_3 + 3NaNO_3$$

*For ferrous iron.*

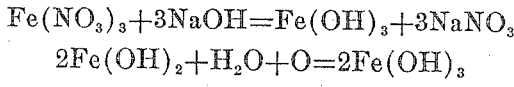
$$Fe(NO_3)_3 + 3NaOH = Fe(OH)_3 + 3NaNO_3$$
$$2Fe(OH)_2 + H_2O + O = 2Fe(OH)_3$$

*For lead.*

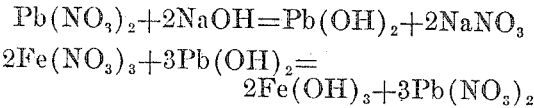
$$Pb(NO_3)_2 + 2NaOH = Pb(OH)_2 + 2NaNO_3$$
$$2Fe(NO_3)_3 + 3Pb(OH)_2 = 2Fe(OH)_3 + 3Pb(NO_3)_2$$

Ferric iron is thus precipitated directly as hydroxid. Ferrous iron is thrown down as ferrous hydroxid and subsequently oxidized to the ferric form. Any lead hydroxid formed interacts with the ferric nitrate as already described with respect to the lead carbonate. The reaction thus proceeds in an analogous manner whether the carbonate or hydroxid of the alkali is used.

Traces of arsenic and bismuth present in solution will be removed upon addition of the alkali, the arsenic combining with the ferric hydroxid to form basic ferric arsenite, and the bismuth being hydrolized to the insoluble sub-nitrate.

After removal of the iron and other impurities the lead nitrate solution is sufficiently pure so that it can be treated at once with precipitating agents in the tank L and the lead obtained either as basic carbonate by precipitation with a mixture of sodium hydroxid and sodium carbonate, or as lead chromate by precipitation with an alkali chromate. The novel precipitation method for effecting this precipitation, and the recovery and reuse of the various solutions therefrom, are described and claimed in another application.

We claim:—

1. The process of purifying lead nitrate solutions from accompanying iron nitrate which comprises adding to such solutions an amount of an alkali insufficient to precipitate all of the iron as ferric hydroxid, heating such solution to effect reaction between any precipitated basic lead compounds and the remaining iron in solution to form the insoluble iron precipitate and the soluble lead compound, and finally adding sufficient alkali to precipitate the remaining small amount of iron as ferric hydroxid.

2. The process of purifying lead nitrate solutions from accompanying iron nitrate which comprises adding to such solutions an amount of sodium carbonate insufficient to precipitate all of the iron as ferric hydroxid, heating such solution to effect reaction between any precipitated basic lead compounds and the remaining iron in solution to form the insoluble iron precipitate and the soluble lead compound and finally adding sufficient sodium carbonate to precipitate the remaining small amount of iron as ferric hydroxid.

3. The process of purifying impure lead nitrate solution from a relatively small amount of iron in solution which consists in adding sufficient alkali precipitate to major portion of the iron as hydroxid and subsequently adding sufficient alkali to precipitate the entire remaining portion of the iron.

In testimony whereof we affix our signatures in presence of two witnesses.

SAMUEL W. ANDERSON.
GROVER C. KAAR.

Witnesses:
L. L. WESTFALL,
WILLIAM H. KAYE.